(12) United States Patent
Jossem et al.

(10) Patent No.: US 7,954,744 B2
(45) Date of Patent: Jun. 7, 2011

(54) ROLLING FOOD PROCESSOR

(75) Inventors: Adam A. Jossem, Seattle, WA (US); David A. Holcomb, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 205 days.

(21) Appl. No.: 12/137,192

(22) Filed: Jun. 11, 2008

(65) Prior Publication Data
US 2008/0302895 A1   Dec. 11, 2008

Related U.S. Application Data

(60) Provisional application No. 60/943,241, filed on Jun. 11, 2007.

(51) Int. Cl.
*A47J 43/00* (2006.01)
(52) U.S. Cl. .................................................. 241/169.1
(58) Field of Classification Search ............. 30/306, 30/307, 319; 241/169.1; 83/932; D7/694, D7/383, 372
See application file for complete search history.

(56) References Cited

U.S. PATENT DOCUMENTS

| | | | |
|---|---|---|---|
| 375,807 A * | 1/1888 | Faris et al. ............... | 241/101.78 |
| 507,903 A | 10/1893 | Hancock | |
| 801,466 A * | 10/1905 | Listle ............................. | 30/306 |
| 1,194,318 A | 8/1916 | Power | |
| 1,284,131 A * | 11/1918 | Murdick .................... | 241/101.5 |
| 1,511,287 A | 10/1924 | Lindley | |
| 1,619,550 A | 3/1927 | Thebaud et al. | |
| 1,991,546 A * | 2/1935 | Czapar, Jr. ...................... | 30/304 |
| 2,246,054 A | 6/1941 | Marty | |
| 2,347,383 A | 4/1944 | Wiegratz | |
| 2,407,819 A | 9/1946 | Dolan | |
| 2,592,481 A | 4/1952 | Spencer et al. | |
| 2,796,987 A | 6/1957 | Meyer | |
| 3,123,114 A | 3/1964 | Andrews et al. | |
| D199,261 S * | 9/1964 | Murphy | |
| 3,156,278 A | 11/1964 | Otto | |
| 3,581,790 A | 6/1971 | Del Conte | |
| 3,990,358 A | 11/1976 | Cade | |
| 4,007,751 A | 2/1977 | Commiant | |
| 4,124,310 A | 11/1978 | Brackman et al. | |
| 4,442,764 A | 4/1984 | Bos et al. | |
| 4,682,740 A | 7/1987 | Conigliaro et al. | |
| 4,768,429 A | 9/1988 | Federighi | |
| 4,905,465 A | 3/1990 | Jones et al. | |
| D315,657 S | 3/1991 | Ruttimann | |
| 5,245,726 A | 9/1993 | Rote et al. | |
| 5,360,170 A | 11/1994 | Cartellone | |
| 5,401,159 A | 3/1995 | Hsu | |

(Continued)

FOREIGN PATENT DOCUMENTS
FR    1012262    7/1952
(Continued)

*Primary Examiner* — Mark Rosenbaum
(74) *Attorney, Agent, or Firm* — Seed IP Law Group PLLC

(57) ABSTRACT

A rolling food processor includes a body forming a chamber, a blade assembly, and a roller assembly. The blade assembly may include a hub and a plurality of blades mounted about the hub and positioned within the chamber, the blade assembly being rotatably coupled to the roller assembly. The roller assembly includes at least one rolling member such that when a user rolls or reciprocates the rolling member on a surface, the hub and the blades rotate to process a food item selectively positioned in the chamber.

7 Claims, 11 Drawing Sheets

U.S. PATENT DOCUMENTS

| | | | |
|---|---|---|---|
| 5,435,237 A | 7/1995 | Huang | |
| 5,456,010 A * | 10/1995 | Bryda | 30/287 |
| D375,435 S * | 11/1996 | Knapp | |
| 5,617,783 A | 4/1997 | Beeler | |
| 5,735,193 A | 4/1998 | Chang | |
| 5,782,416 A | 7/1998 | Nejatbina | |
| D396,992 S | 8/1998 | Lallemand | |
| 5,823,672 A | 10/1998 | Barker | |
| 5,960,709 A | 10/1999 | Yip | |
| 5,996,483 A | 12/1999 | Yip | |
| 6,000,650 A | 12/1999 | Penaranda et al. | |
| 6,035,771 A | 3/2000 | Conran et al. | |

FOREIGN PATENT DOCUMENTS

| | | |
|---|---|---|
| FR | 2713069 A1 | 6/1995 |
| JP | 5726670 Y2 | 6/1982 |
| JP | 62100989 U | 6/1987 |
| JP | 2046276 A | 2/1990 |
| JP | 3022041 U | 12/1995 |
| JP | 10174647 A | 6/1998 |
| WO | 2007/022839 A1 | 3/2007 |

\* cited by examiner

ROLLING FOOD PROCESSOR

This application claims the benefit under 35 U.S.C. §119 (e) of U.S. Provisional Patent Application No. 60/943,241 filed Jun. 11, 2007 where this provisional application is incorporated herein by reference in its entirety.

BACKGROUND

1. Technical Field

The present disclosure is generally related to kitchenware, and more particularly, to a device for processing a food item, such as for chopping garlic or onion.

2. Description of the Related Art

Devices used to grate, grind, mince, or chop or otherwise process food items or ingredients for cooking typically suffer from being hard to clean and inconvenient to use. Furthermore, to adjust the degree at which food items are chopped or minced is usually difficult to control using manual devices. Therefore, to control the degree of grating, chopping, grinding, or mincing, users generally turn to electrical and complicated food processors that are expensive and require additional time and effort for cleaning. Furthermore, such devices take valuable space for storage when in use, which otherwise can be used to store other items. Other devices such as graters are typically difficult to use and control with respect to the degree of grating, and expose a user to sharp portions of the grater.

BRIEF SUMMARY

According to one embodiment, a food processing device is provided, which is operable to process a food item when a user rolls the device on a surface. In one aspect the food processing device includes a body having a chamber configured to receive the food item, and a processing assembly having a plurality of blades configured to rotate in at least a portion of the chamber, and at least one rolling member rotatably coupled to the plurality of blades to rotate therewith, wherein rolling the food processing device on a surface rotates the rolling member and rotation of the rolling member rotates the plurality of blades in the chamber to process the food item.

A food processing device according to another embodiment includes a body, a blade assembly, and a roller assembly. The body includes a chamber configured to receive the food item. The blade assembly includes at least one blade rotatably mounted with respect to the chamber, the at least one blade being configured to rotate at least partially within the chamber when actuated to process the food item. Further, the roller assembly includes at least a first rolling member rotatably coupled to the body and configured to rotatably engage a portion of the blade assembly for rotating the at least one blade in the chamber when the rolling member rotates, allowing the user to process the food item by rolling or reciprocating the food processing device on the surface.

According to one aspect, the food processing device also includes an actuation mechanism configured to rotate the rolling member to process the food item when the actuation mechanism is activated. For example, the actuation mechanism can be an electric motor or a winding member.

DETAILED DESCRIPTION

Figure 1:
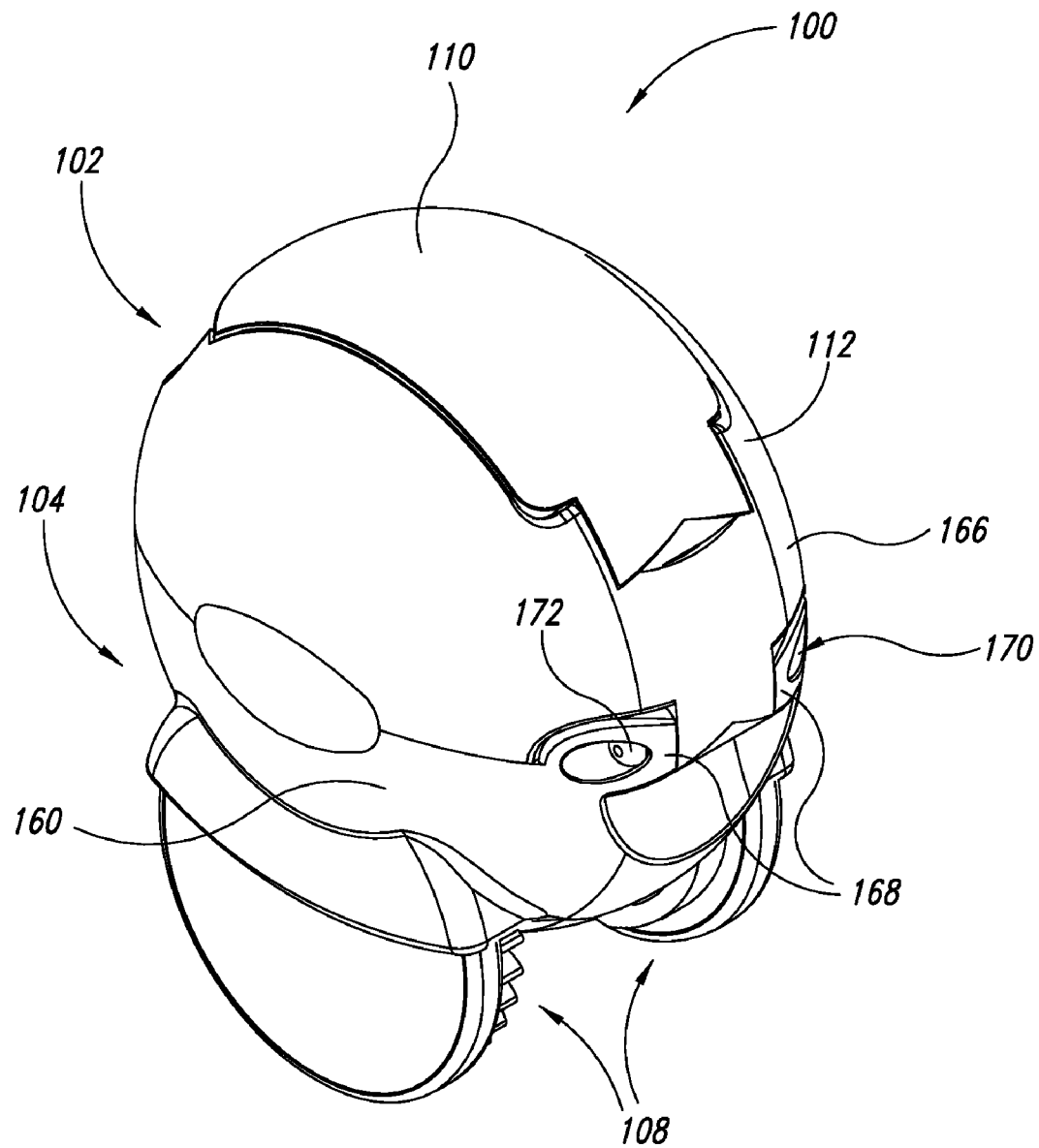
FIG. 1 is an isometric view of a rolling food processor according to one embodiment.

FIG. 1 illustrates one embodiment, in which a rolling food processor 100 includes an upper body 102, a lower body 104, a blade assembly 106 (FIG. 2), and roller assembly 108. The upper body 102 includes a fill lid 110 removably or pivotably coupled to an upper shell 112. The fill lid 110 can be at least partially moved away, for example removed or pivoted away, from the upper shell 112 to allow a user to place a food item, such as garlic, inside the rolling food processor 100. The fill lid 110 is configured to move or pivot toward the upper body 102 to seal the food item in the rolling food processor 100. The upper shell 112 can be pivotably coupled to the lower body 104.

Figure 2:
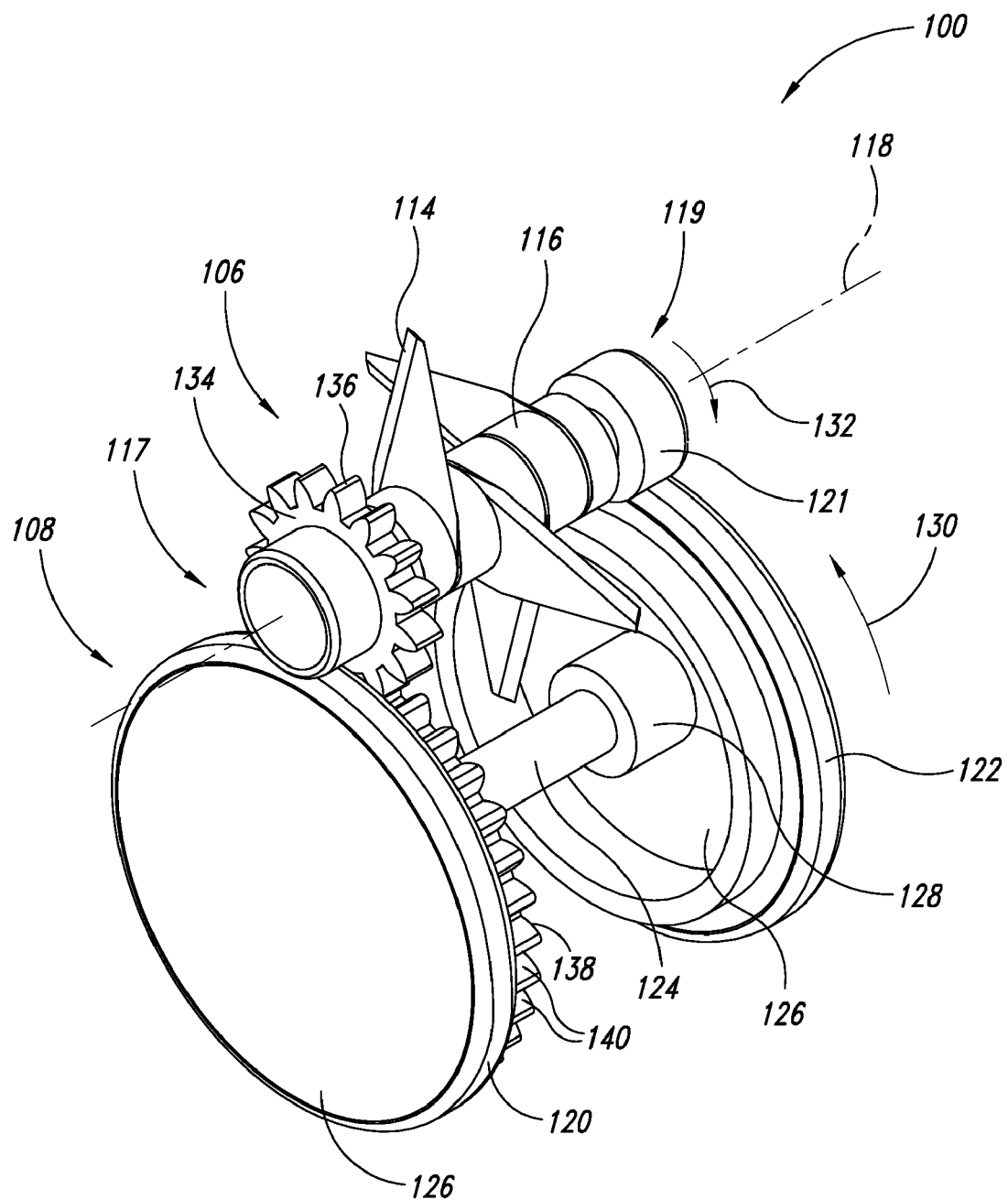
FIG. 2 is an isometric view of a portion of the rolling food processor of FIG. 1.

FIG. 2 illustrates the blade assembly 106 and the roller assembly 108 according to one embodiment, with the upper and lower bodies 102, 104 (FIG. 1) removed for clarity of illustration and description. The blade assembly 106 includes at least one blade 114 mounted on an upper hub 116, and in some embodiments, more than one blade 114 mounted on one or more hubs 116. The blades 114 are rotatably mounted with respect to the upper and lower bodies 102, 104.

For example, in one embodiment, the blades 114 can project outwardly from the upper hub 116, which includes an axis of rotation 118 extending substantially transversely with respect to the rolling food processor 100. The upper hub 116 can be elongated and extend beyond the blades 114 in a direction substantially parallel to the axis of rotation 118 and define a first end 117 and a second end 119, laterally opposed to the first end 117.

The roller assembly 108 includes at least a first rolling member 120, and in the illustrated embodiment, also a second rolling member 122. The first and second rolling members 120, 122 can include any structure or shape suitable for rolling on a surface. In one embodiment, the first and second rolling members 120, 122 are configured to easily accommodate rolling the rolling food processor 100 on a surface. For example, the first and second rolling members 120, 122 may comprise a spherical, cylindrical, or circular shape (e.g., a wheel configuration) for easily rolling on a surface. The first and second rolling members 120, 122 can be independently rotatably coupled to one of the upper and lower bodies 102, 104. Alternatively, the first rolling member 120 can be coupled to the second rolling member 122 to rotate as a unit therewith.

For example, an axle 124 can extend between and couple the first rolling member 120 to the second rolling member 122. In one embodiment, each of the first and second rolling members 120, 122 can include a hub 126 having a receptacle 128 positioned toward a central portion thereof and configured to fixedly receive an end of the axle 124 such that the first and second rolling members 120, 122 rotate with the axle 124. Alternatively, in another embodiment, the first and second rolling members 120, 122 can be rotatably coupled to the axle 124, for example via use of a ball bearing member (not shown) therebetween.

At least one of the first and second ends 117, 119 of the upper hub 116 can be configured to rotate with the roller assembly 108 and facilitate rotation of a remainder of the upper hub 116 which also will cause rotation of the blades 114. For example, the upper hub 116 can include a third rolling member 121 toward the second end 119, positioned on a perimeter of the second rolling member 122 such that as the second rolling member 122 rotates in a first direction 130, friction between the second rolling member 122 and third rolling member 121 of the upper hub 116 will rotate the upper hub 116 in a second direction 132, opposite the first direction 130. As the upper hub 116 rotates, the blades 114 rotate for processing the food inside. One of ordinary skill in the art can appreciate that the blades 114 can be designed to produce a desired result such as grating, grinding, mincing, chopping, or blending the contents. Additionally more than one blade assembly 106 can be provided each having a distinct set of blades 114 for replacing the blade assembly 106 to accommodate an intended use.

In the illustrated embodiment, both the first and second ends 117, 119 of the upper hub 116 are positioned on respective perimeters of the first and second rolling members 120, 122. Furthermore, at least one end of the upper hub 116 may comprise a first gear 134 having a plurality of teeth 136 and configured to rotatably engage a second gear 138 having a plurality of teeth 140. For example, the second gear 138 can be positioned to rotate with the first rolling member 120. In one embodiment, the teeth 140 and the second gear 138 are fixedly attached toward an outer perimeter of the hub 126 of the first rolling member 120 for rotating therewith. Additionally, the first gear 134 can be concentrically and fixedly mounted toward the first end 117 of the upper hub 116. The teeth 136, 140 of each of the first and second gears 134, 138 nest in recesses formed between the teeth 140, 136 of the other of the first and second gears 138, 134, and as the rolling members 120, 122 rotate, the second gear 138 facilitates rotation of the first gear 134 and thus of the upper hub 116 to rotate the blades 114.

In one embodiment, the first gear 134 and the plurality of teeth 136 of the first gear 134 can be formed from a unitary body of material. In addition, or instead, the upper hub 116 can be formed from a unitary body of material with the first gear 134. Similarly, the second gear 138 and the plurality of teeth 140 of the second gear 138 can be formed from a unitary body of material. In addition, or instead, the upper hub 116 can be formed from a unitary body of material with the second gear 138.

In one embodiment, the first and/or the second rolling members 120, 122 and/or the second gear 138 can be sized to be larger than the upper hub 116, the third rolling member 121, and/or the first gear 134. In such a configuration every revolution of the rolling members 120, 122 results in a larger number of revolutions of the upper hub 116. Accordingly the blades 114 more optimally and expediently process contents of the rolling food processor 100. The respective sizes of these components can be designed such that specific number of revolutions of the rolling members 120, 122 causes a specific degree of processing of the contents. For example, rolling the rolling members 120, 122 by a first number of revolutions may cause a slicing effect, a second number of revolutions may cause a mincing effect, a third number of revolutions may cause a grating effect, and a fourth number of revolutions, a powdering effect, and so on. One of ordinary skill in the art will appreciate that based on the same concept, rolling the food processor 100 back and forth a number of times on a surface along a predetermined distance can also produce a corresponding desired result so that a user need not continuously roll the rolling food processor 100 on a surface. Accordingly, a space required to process the contents need not be large.

One of ordinary skill in the art will appreciate that in another embodiment, a similar gear mechanism can be provided with respect to the second rolling member 122 and toward the second end 119 of the upper hub 116.

The following description provides an example of one configuration of the upper and lower bodies 102, 104 for enclosing an interior chamber of the rolling food processor 100 in which the food item is placed for processing. One of ordinary skill in the art will appreciate that other suitable structures and shapes for providing such an enclosure are possible and contemplated to be within the scope of this disclosure and the claims that follow.

Figure 3:
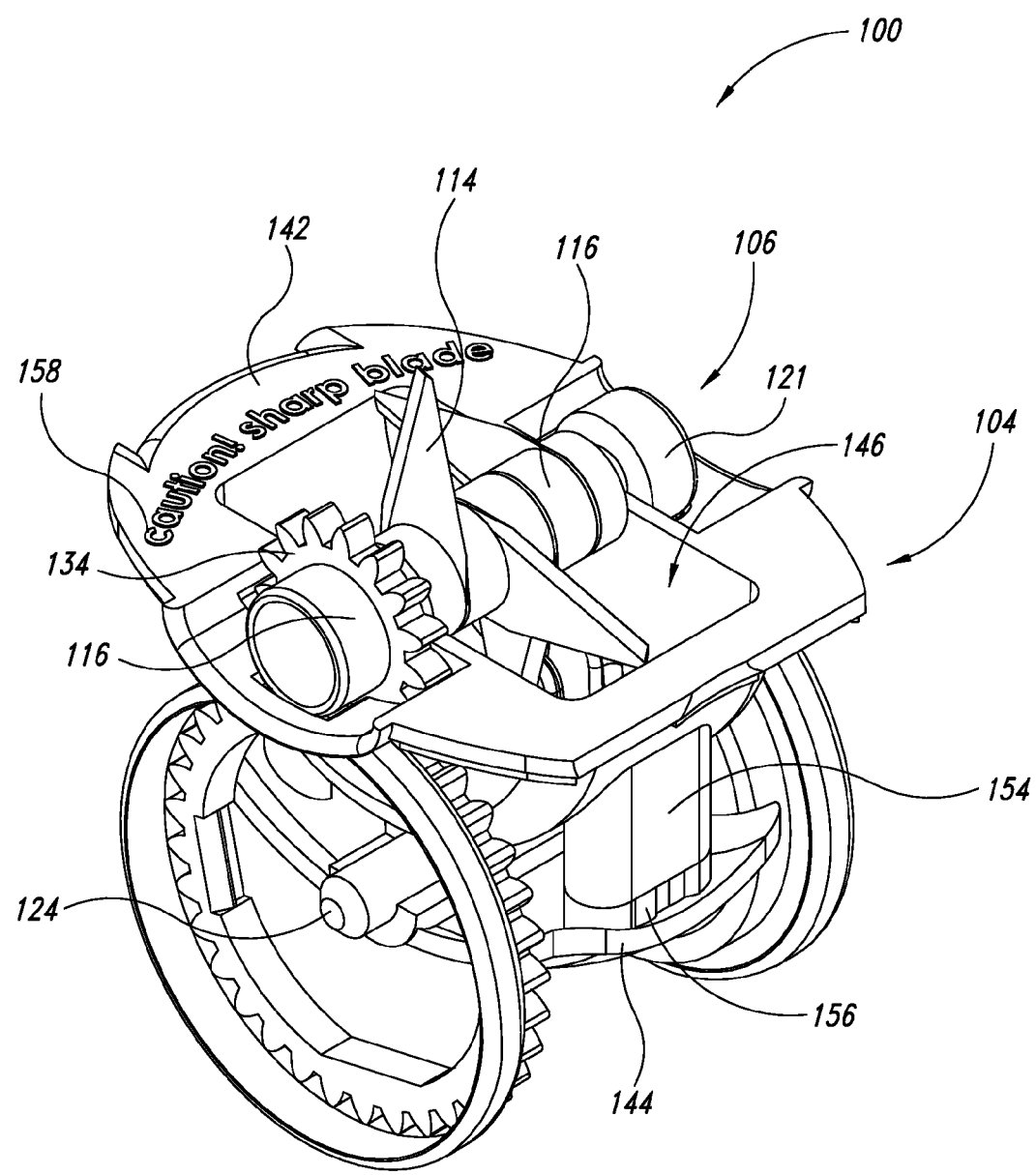
FIG. 3 is an isometric view a portion of the rolling food processor of FIG. 1.

FIG. 3 illustrates a portion of the rolling food processor 100 with the upper body 102 (FIG. 1), a portion of the lower body 104, and the hub 126 (FIG. 2) of the first rolling member 120 removed for clarity of description and illustration. As illustrated in FIG. 3, the lower body 102 includes a lower chamber shell 142 and a lower cap 144. The lower chamber shell 142 forms a lower chamber 146 configured to receive at least a portion of the food item or items to be processed. The lower chamber shell 142 is configured to house at least a portion of the blade assembly 106, for example the blades 114, in the lower chamber 146 for processing the food item. The lower chamber shell 142 is also configured to allow the interaction between the upper hub 116, the third rolling member 121 and/or first gear 134 with the roller assembly 108, as discussed above, for rotating the upper hub 116.

Figure 4:
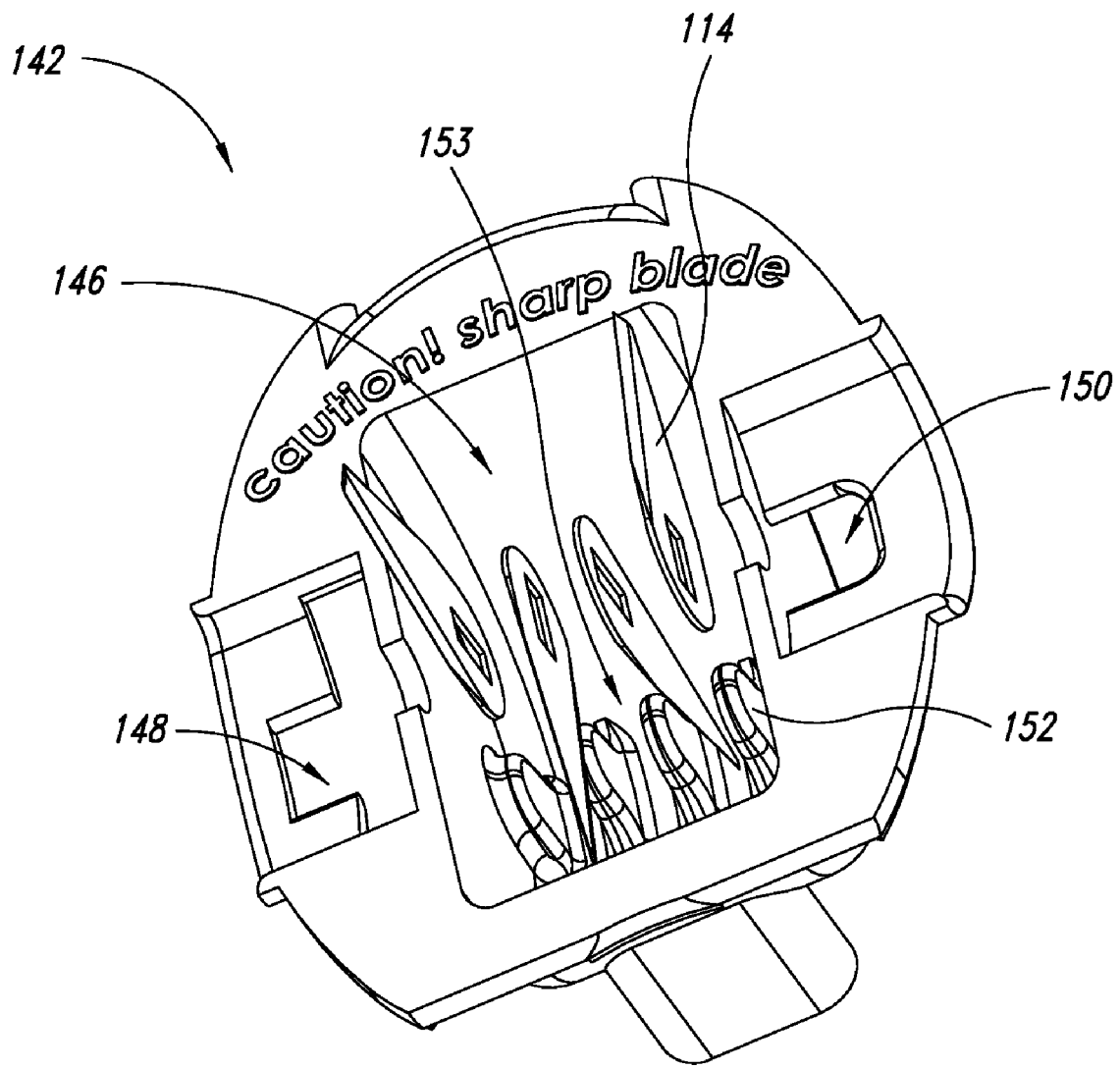
FIG. 4 is an isometric view of a portion of the rolling food processor of FIG. 1.

For example, as shown in FIG. 4, the lower chamber shell 142 comprises a first opening 148 and a second opening 150 formed toward opposing transverse ends of the lower chamber shell 142, through which the first gear 134 and the third rolling member 121 can protrude and be rotatably coupled to or positioned on the second gear 138 and the second rolling member 122 respectively (See FIG. 3). FIG. 4 only shows the blades 114 and the lower shell 142. The lower shell 142 may comprise at least one protuberance 152 or a plurality of protuberances 152 arranged in a series forming channels 153 therebetween. The protuberances 152 can function as stops or obstacles in a path of the moving food item when the food item is being processed to further expedite and facilitate the processing. As one of skill in the art will appreciate, as the blades 114 rotate and confront the food item, the protuberances 152 may block a free rotation of the food item as the blades 114 rotate, to more optimally process the food item. In one embodiment, protuberances 152 can be arranged such that the blades 114 travel through the channels 153 formed between the protuberances 152. FIG. 4 illustrates one example of such configuration; however, the protuberances 152 can additionally, or alternatively, be positioned in any location about the lower chamber 146.

As illustrated in FIG. 3, the lower cap 144 can optionally be included to cover the axle 124 and provide a more aesthetically pleasing and ergonomic shape to the rolling food processor 100. For example, the lower shell 142 and the lower cap 144 may respectively include first and second complementary coupling members 154, 156 configured to fixedly engage the lower shell 142 to the lower cap 144. Additionally, at least one surface of the lower shell 142 may be sized to carry indicia 158 meant by a manufacturer to be read by the user of the rolling food processor 100, for example with respect to usage or cautionary advice.

Figure 5:
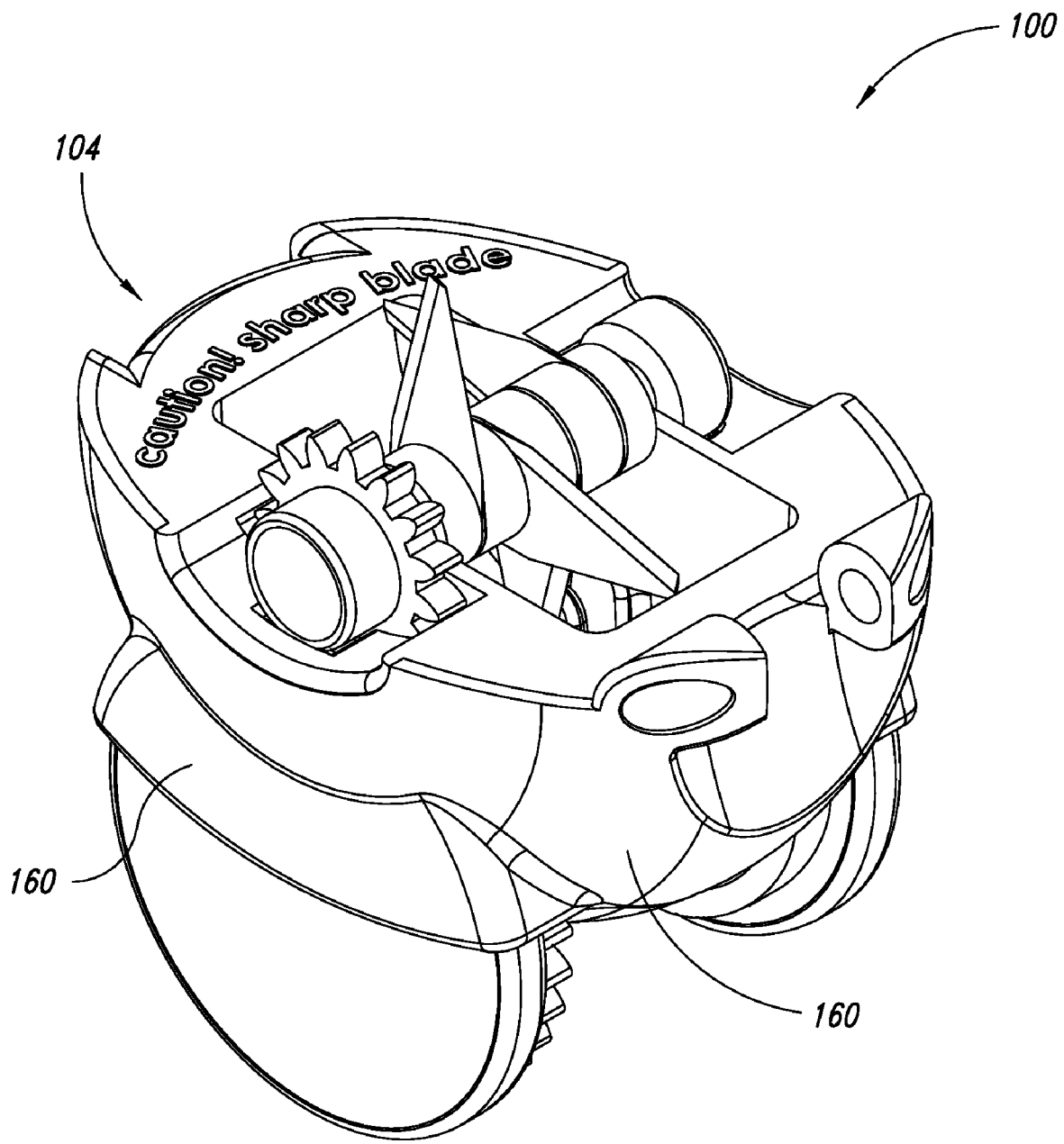
FIG. 5 is an isometric view of a portion of the rolling food processor of FIG. 1.

FIG. 5 illustrates the rolling food processor 100 with the upper body 102 (FIG. 1) removed for clarity of description and illustration. As illustrated in FIG. 5, some embodiments may include a lower ergonomic fairing 160 extending about and coupling to the lower chamber shell 142 and/or the lower cap 144. The lower ergonomic fairing 160 acts in conjunction with components of the upper body 102, discussed below, to provide an ergonomic shape that can comfortably nest in a palm of a user.

Figure 6:
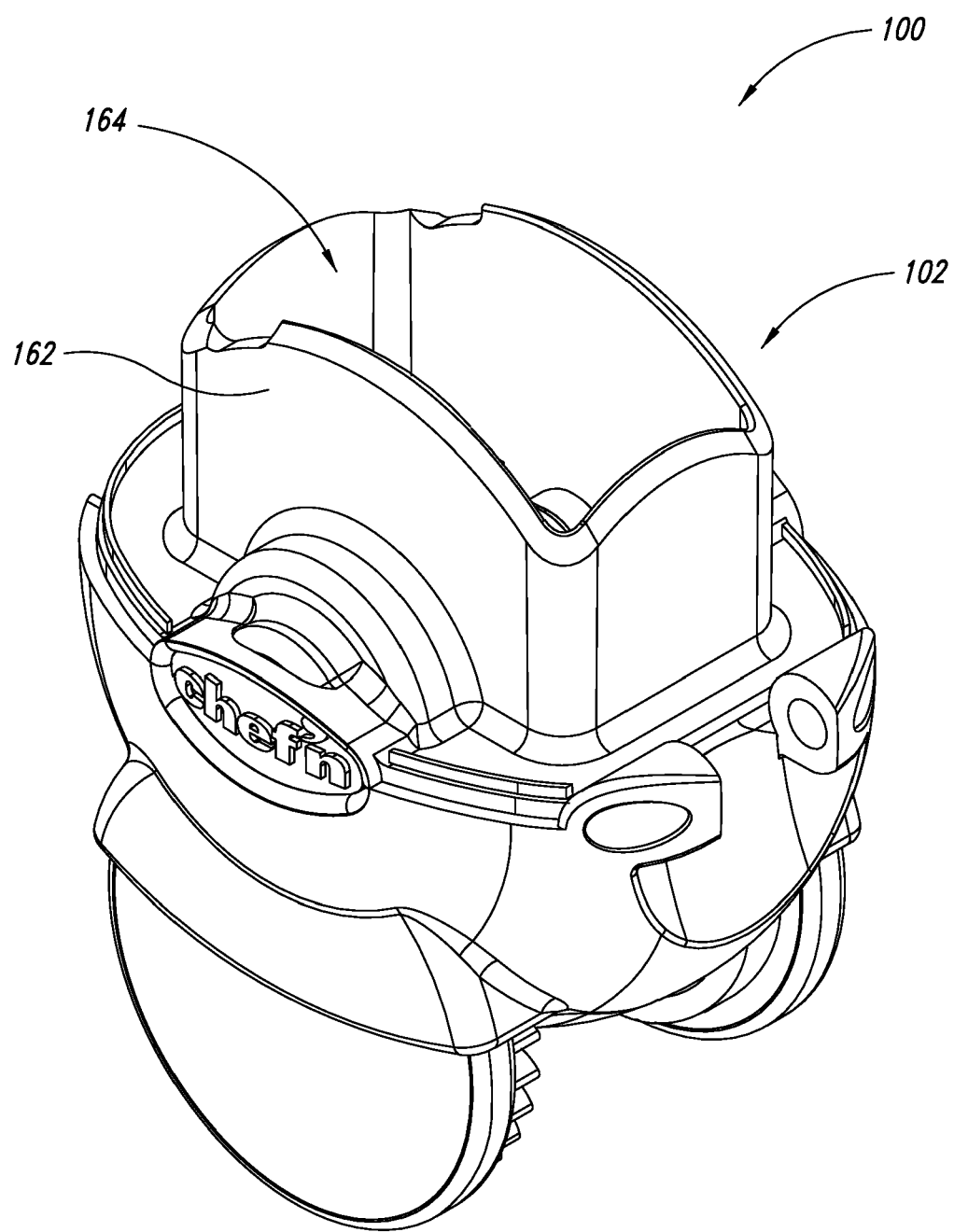
FIG. 6 is an isometric view of a portion of the rolling food processor of FIG. 1.

FIG. 6 illustrates the rolling food processor 100 with a portion of the upper body 102 removed for clarity of description and illustration. The upper body 102 includes an upper chamber shell 162 forming an upper chamber 164 that can be exposed to receive the food item by manipulating the lid 110 (FIG. 1). The upper chamber 164 and the lower chamber 146 form an integral chamber in which the food item can be processed when the rolling food processor is in use. One of ordinary skill in the art will appreciate that the upper chamber shell 162 can also comprise protuberances similar to the protuberances 152 (FIG. 4), discussed above with respect to the lower chamber shell 142.

Figure 7:
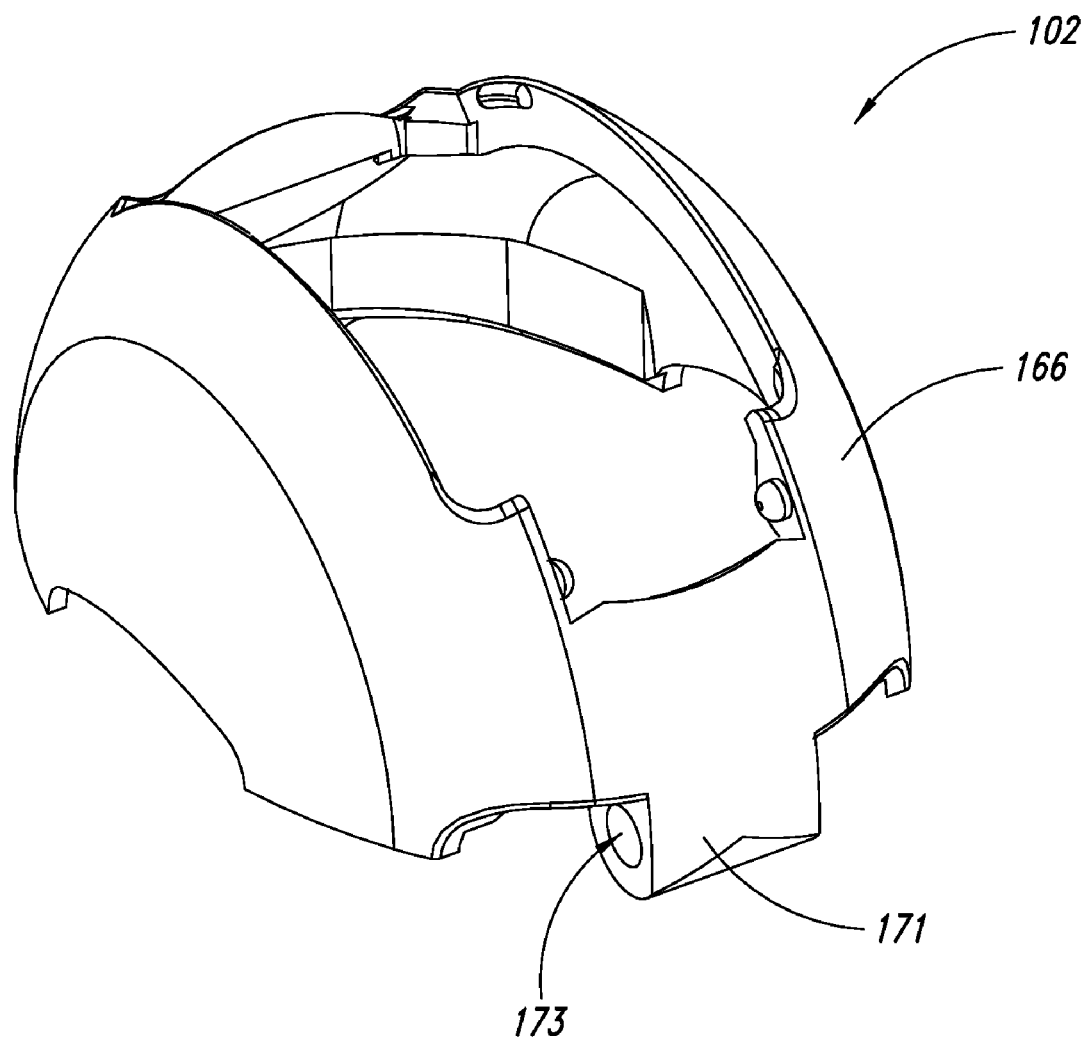
FIG. 7 is an isometric view of a portion of the rolling food processor of FIG. 1.

Referring back to FIG. 1, the upper body 102 may include an upper ergonomic fairing 166 extending about and coupling to at least a portion of a remainder of the rolling food processor 100. As discussed previously, the upper body 102 may be pivotably coupled to the lower body 104 for allowing the upper ergonomic fairing 166 to pivot away from the lower body 104. For example, the lower ergonomic fairing 160 may comprise two spaced portions 168 with openings 170 extending therethrough. As illustrated in FIG. 7, a portion of the upper body 102, such as the upper ergonomic fairing 166 may comprise a pivot portion 171 with an opening 173 therethrough, the pivot portion 171 being positionable inbetween the spaced portions 168 (FIG. 1), the openings 173 of the pivot portion 171 aligning with the openings 170 (FIG. 1) through the spaced portions 168 of the lower ergonomic fairing 160 (FIG. 1).

As illustrated in FIG. 1, a pivot pin 172 can extend through the opening 173 (FIG. 7) of the pivot portion 171 (FIG. 7) and the openings 170 of the spaced portions 168 to facilitate pivoting the upper body 102 with respect to the lower body 104. Such an arrangement provides for easy disassembly of the rolling food processor 100 for emptying the processed food item or items, and/or cleaning the components of the rolling food processor 100, after use.

When assembled, the upper ergonomic fairing 166 acts in concert with the lower ergonomic fairing 160 to provide an integral ergonomic shape configured to comfortably fit in the palm of the user for rolling the processor 100 on a surface to process the food item or items inside. However, one of ordinary skill in the art will appreciate that a rolling food processor according to other embodiments may have an external shape that varies dramatically from the external shapes disclosed without deviating from the scope of the present disclosure.

Although certain embodiments and examples of a rolling food processor and features and components thereof have been discussed to provide a through understanding of an operation of the processor, one of ordinary skill in the art can appreciate that various structures and configurations are possible within the scope of this disclosure, which allow a user to roll the food processor on a surface to mince, dice, cut, chop, grind, pulverize, crush, blend, grate, or otherwise process a content of the rolling food processor. For example, portions of the food processor, such as the upper and lower bodies, or portions thereof, such as the upper and lower chambers can be integrally formed from a unitary body of material. Additionally, more gears or fewer gears can be used in conjunction with friction between the rolling components to achieve the rotation of the upper hub. Also, in other embodiments the rolling food processor may only utilize one wheel. Other configurations are possible.

Figure 8:
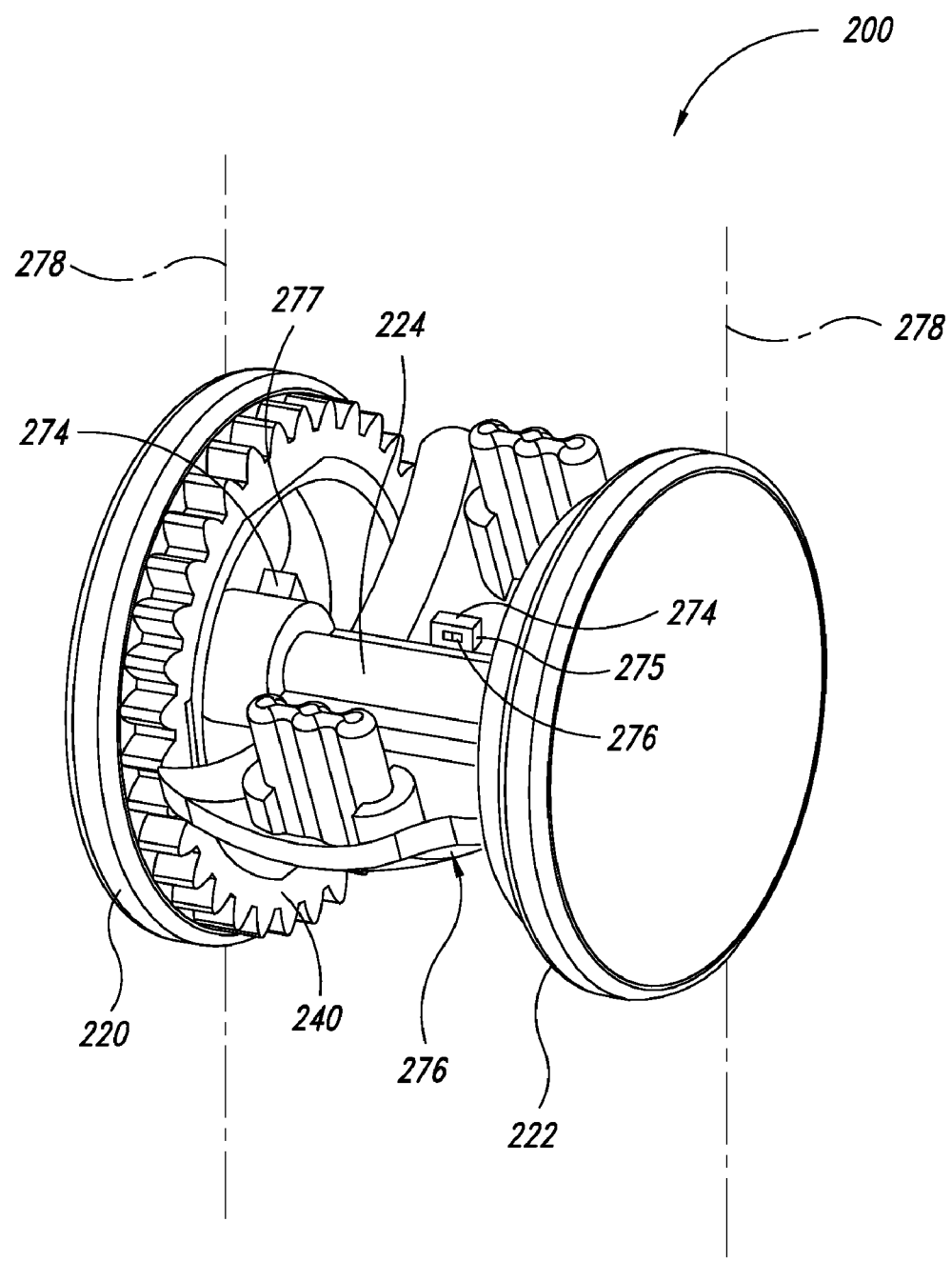
FIG. 8 is an isometric view of a portion of a rolling food processor according to another embodiment.

In another embodiment, as illustrated in FIG. 8, a rolling food processor 200, a portion of which is shown, may include at least one biasing device 274, which is configured to bias at least one of the axle 224, the rolling members 220, 222, or the gear 240. In one aspect, the biasing device may include an electric motor 275 that can be activated by a switch 276, which can be positioned proximate the motor 275 or remotely with respect thereto, for example, at a location on an exposed portion of the processor 200 so that the user can easily access it.

In such an embodiment the rolling members 220, 222 can be configured so that the rolling food processor 200 travels in an arcuate path such as a circular or elliptical path. When the user turns the switch 276 to an "ON" position, the motor imparts motion to the rolling members 220, 222, the rolling food processor 200 turning in the arcuate path and processing the food item as discussed herein. For example, one of the rolling members 220, 222 can be larger than the other of the rolling members 222, 220. In addition, or instead, the rolling members 220, 222 may be tilted about a longitudinal axis 278 thereof.

In another aspect, the biasing device 274 may include a spring or other winding member 277 in mechanical communication with the rolling members 220, 222, and configured to be wound. In such an embodiment, the winding member 277 may be configured to be wound to build a potential for biasing, for example, by the user rolling the rolling members 220, 222 on a surface in one direction and lifting the rolling members 220, 222 away from the surface or releasing the processor 200, so that the potential for biasing is released to rotate the rolling members 220, 222, the rolling members 220, 222 rotating even after the spring completes biasing the rolling members 220, 222 via a generated momentum thereof, to rotate the upper hub and/or the blades and process the food item.

Portions of the rolling food processor 200 of this embodiment, which are not shown, are substantially identical to those of the embodiment discussed above.

Figure 9:
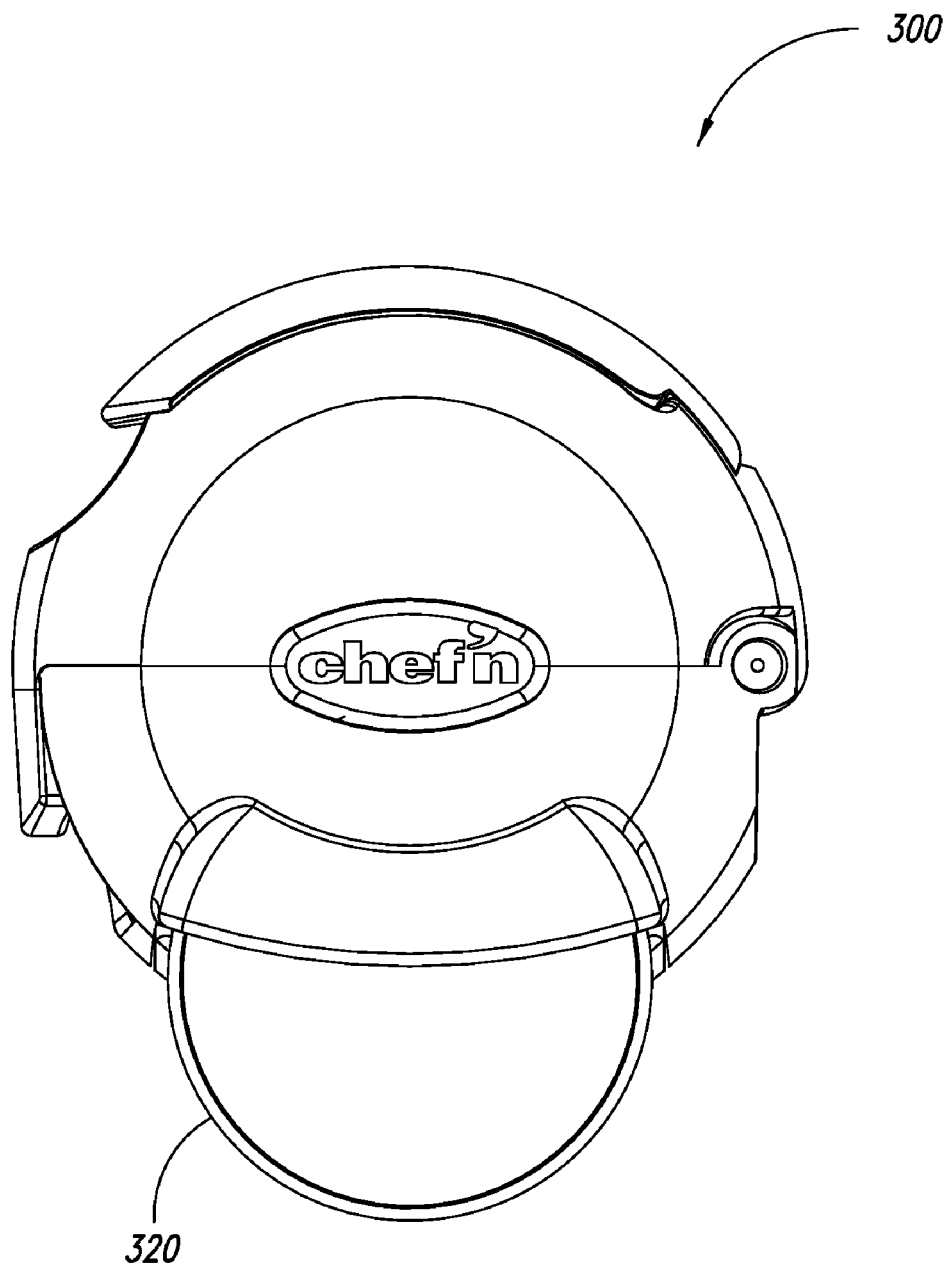
FIG. 9 is an isometric view of a rolling food processor according to yet another embodiment.

In other embodiments, the rolling food processor may include more or fewer features, without deviating from the scope of the present disclosure. For example, in one embodiment, as illustrated in FIG. 9, a rolling food processor 300 includes only one rolling member 320. One of ordinary skill in the art can appreciate, in yet other embodiments more than two rolling members can be utilized. Furthermore, a rolling food processor according to embodiments of the present disclosure may be provided in different shapes and sizes. For example, it can be larger for processing a larger quantity of the food item or food items of larger sizes.

Figure 10:
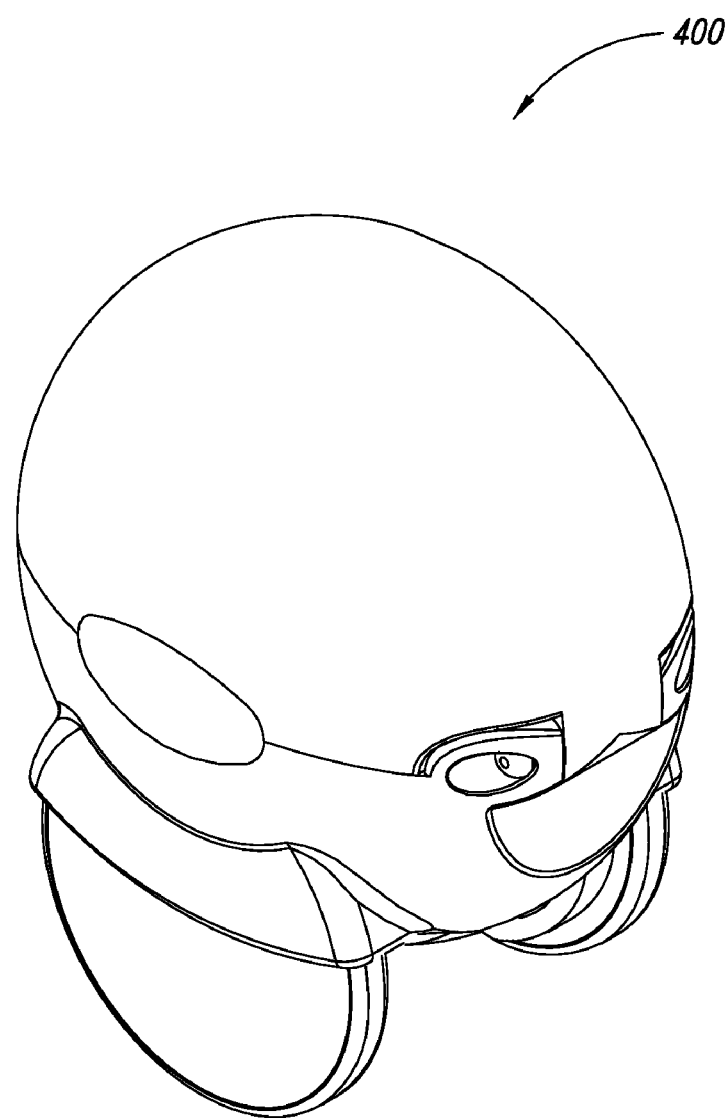
FIG. 10 is an isometric view of a rolling food processor according to still another embodiment.
Figure 11:
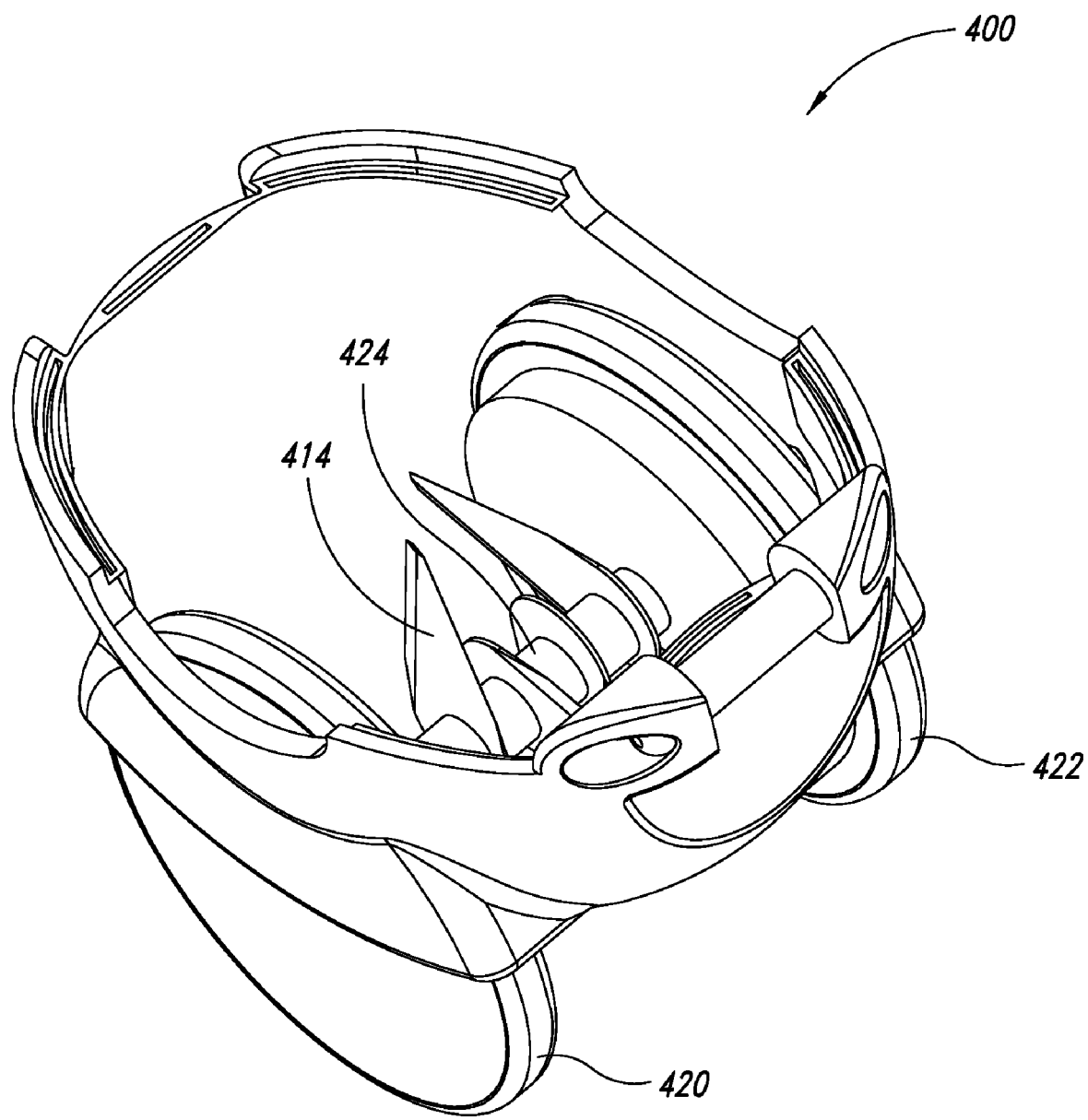
FIG. 11 is an isometric view of a portion of the rolling food processor of FIG. 10.

In another embodiment, as illustrated in FIGS. 10 and 11, a rolling food processor 400 may include an axle 424 extending between first and second rolling members 420, 422, which also serves as a hub for blades 414.

All the components of the rolling food processors 100, 200, 300, 400 may be fabricated from any material such as metals, woods, plastics, rubbers, composites, silicone, any combination thereof, or any other suitable material. Different components may have different compositions that may be more suitable for their function. For example the rolling members 120, 122, 220, 222, 320, 420, 422 may be fabricated from rubbers, plastics, or silicone.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A handheld kitchen device for processing a food item by moving the device along a countertop or other surface, the device comprising:
   a body sized and shaped to be held in a palm of a hand and manipulated by a user, the body having a chamber configured to receive the food item for processing, the chamber being enclosed to prevent a piece of the food item from being ejected from the chamber during processing;
   a blade assembly having at least one blade rotatably mounted with respect to the chamber, the entire blade being housed within the body to prevent the blade from cutting the user during use, the at least one blade being configured to rotate at least partially within the chamber when actuated to process the food item;
   a roller assembly having at least a first rolling member rotatably coupled to the body and configured to rotatably engage a portion of the blade assembly and rotate the at least one blade in the chamber when the rolling member rotates, allowing a user to process the food item by moving the food processing device along the surface; and
   a lid removably or pivotably coupled to the body for selectively moving away from the body to allow the food item to be placed into or removed from the chamber, and for selectively moving toward the body for closing the chamber during operation.

2. A food processing device for processing a food item by moving the device along a surface, the device comprising:
   a body having a chamber configured to receive the food item, the body comprising an upper portion and a lower portion coupled to the upper portion to be selectively movable with respect thereto;
   a blade assembly having at least one blade rotatably mounted with respect to the chamber between the upper and lower portions of the body such that the at least one blade can be removed from the body for cleaning or otherwise when the lower portion is moved apart from the upper portion, the at least one blade being configured to rotate at least partially within the chamber when actuated to process the food item;
   a roller assembly having at least a first rolling member rotatably coupled to the lower portion of the body and configured to rotatably engage a portion of the blade assembly and to rotate the at least one blade in the chamber when the rolling member rotates, allowing a user to process the food item by moving the food processing device along the surface;
   wherein the blade assembly includes a first hub and a plurality of blades mounted on the first hub to rotate therewith, a first plurality of gear teeth located on the first hub, the first rolling member having a second plurality of gear teeth located about at least a portion of a perimeter of the first rolling member, the second plurality of teeth being configured to rotatably engage the first plurality of teeth.

3. A handheld kitchen device for processing a food item by moving the device along a countertop or other surface, the device comprising:
   a body having a chamber configured to receive the food item, the chamber being fully enclosed to prevent the food item from being ejected from the chamber during use;
   a blade assembly having at least one blade rotatably mounted with respect to the chamber, the blade being completely housed within the body to prevent the blade from cutting the user during use, the at least one blade being configured to rotate at least partially within the chamber when actuated to process the food item;
   a roller assembly having at least a first rolling member rotatably coupled to the body and configured to rotatably engage a portion of the blade assembly for rotating the at least one blade in the chamber when the rolling member rotates, allowing a user to process the food item by moving the device on the surface; and
   at least one protuberance positioned within the chamber and configured either to obstruct the food item when the food item is within a reach of at least one of the plurality of blades or to confront and toss the food item in a path of the rotating blades.

4. The rolling food processor of claim 3 wherein a plurality of protuberances are positioned within the chamber, the plurality of protuberances being arranged in a series and forming a plurality of channels therebetween.

5. The rolling food processor of claim 4 wherein the blade assembly includes a plurality of blades configured to travel through the plurality of channels, respectively, as the plurality of blades rotate in the chamber.

6. A food processing device for processing a food item by rolling a portion of the device along a surface, the device comprising:
   a body having a chamber configured to receive the food item;
   a blade assembly having at least one blade rotatably mounted with respect to the chamber, the at least one blade being configured to rotate at least partially within the chamber when actuated to process the food item;
   a roller assembly having at least a first rolling member rotatably coupled to the body and configured to rotatably engage a portion of the blade assembly for rotating the at least one blade in the chamber when the rolling member rotates, allowing a user to process the food item by moving the food processing device along the surface; and
   an actuation mechanism comprising a winding member configured to build a potential when the at least first rolling member is rotated in a first direction to wind the winding member, such that lifting the food processing device from the surface results in unwinding of the winding member to release the potential and rotate the at least first rolling member in a second direction, opposed to the first direction, to rotate the blade assembly and process the food item.

7. A rolling food processor comprising an upper body pivotably coupled to a lower body, a blade assembly, and a roller assembly, at least a portion of the upper and lower bodies forming a chamber therebetween, the upper body comprising a lid configured to selectively at least partially move away from the upper body for at least partially filling the chamber with a food item, the upper and lower bodies respectively comprising a first and a second ergonomic fairing about the chamber, the roller assembly comprising first and second rolling members each having a hub, an axle extending transversely between the respective hubs and coupling the first and second rolling members, the lower body being mounted on the axle between the first and second rolling members, the blade assembly comprising a plurality of blades mounted on, and extending away from, a hub extending transversely from a first end to a second end, at least a first gear having a plurality of teeth mounted toward the first end, and at least a third rolling member mounted toward the second end, the hub being positioned at least partially between the upper and lower bodies such that the plurality of blades are positioned in the chamber, the first gear rotatably engages a second gear mounted to the first rolling member, and the third rolling member is rotatably positioned on the second rolling member wherein rotation of the first or second rolling members rotates the hub of the blade assembly and the plurality of blades.

* * * * *